US011899652B2

(12) United States Patent
Liu

(10) Patent No.: US 11,899,652 B2
(45) Date of Patent: Feb. 13, 2024

(54) METHOD AND APPARATUS FOR PROCESSING INFORMATION OF BLOCKCHAIN NETWORK, DEVICE AND STORAGE MEDIUM

(71) Applicant: Tencent Technology (Shenzhen) Company Limited, Shenzhen (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/978,906

(22) Filed: Nov. 1, 2022

(65) Prior Publication Data

US 2023/0066467 A1 Mar. 2, 2023

Related U.S. Application Data

(63) Continuation of application No. PCT/CN2021/129944, filed on Nov. 11, 2021.

(30) Foreign Application Priority Data

Dec. 8, 2020 (CN) .......................... 202011420516.3

(51) Int. Cl.
 G06F 16/23 (2019.01)
 G06F 16/27 (2019.01)
(52) U.S. Cl.
 CPC .......... *G06F 16/2365* (2019.01); *G06F 16/27* (2019.01)
(58) Field of Classification Search
 None
 See application file for complete search history.

(56) References Cited

U.S. PATENT DOCUMENTS

2018/0341930 A1* 11/2018 Moir ..................... H04L 9/3239
2019/0303623 A1* 10/2019 Reddy ...................... G06F 8/71
(Continued)

FOREIGN PATENT DOCUMENTS

CN 110493148 A 11/2019
CN 110708171 A 1/2020
(Continued)

OTHER PUBLICATIONS

Tencent Technology, ISR, PCT/CN2021/129944, dated Dec. 27, 2021, 3 pgs.
(Continued)

*Primary Examiner* — Yu Zhao
(74) *Attorney, Agent, or Firm* — Morgan, Lewis & Bockius LLP

(57) ABSTRACT

A method for processing information includes: while performing, by a target consensus node, consensus validation on a first block, in accordance with a determination that a target consensus validation message for performing consensus validation on a second block is received: in accordance with a determination that the target consensus validation message meets a cache condition according to block attribute information of the second block, storing the target consensus validation message into a message cache pool corresponding to the target consensus node; and in accordance with a determination that the consensus validation on the first block is completed, performing consensus validation on the second block based on the target consensus validation message in the message cache pool.

20 Claims, 6 Drawing Sheets

(56) References Cited

U.S. PATENT DOCUMENTS

2020/0084020 A1* 3/2020 Fazzone ............. H04W 12/033
2020/0409941 A1* 12/2020 Bellur .................... G06F 21/64

FOREIGN PATENT DOCUMENTS

| CN | 111241188 A | 6/2020 |
| CN | 111506656 A | 8/2020 |
| CN | 112202933 A | 1/2021 |
| EP | 3563553 A1 | 11/2019 |

OTHER PUBLICATIONS

Tencent Technology, WO, PCT/CN2021/129944, dated Dec. 27, 2021, 4 pgs.
Tencent Technology, IPRP, PCT/CN2021/129944, dated Jun. 13, 2023, 5 pgs.

* cited by examiner

METHOD AND APPARATUS FOR PROCESSING INFORMATION OF BLOCKCHAIN NETWORK, DEVICE AND STORAGE MEDIUM

CROSS-REFERENCE TO RELATED APPLICATIONS

This application is a continuation application of PCT Patent Application No. PCT/CN2021/129944, entitled "INFORMATION PROCESSING METHOD AND APPARATUS FOR BLOCKCHAIN NETWORK, AND DEVICE AND STORAGE MEDIUM" filed on Nov. 11, 2021, which claims priority to Chinese Patent Application No. 202011420516.3, filed with the State Intellectual Property Office of the People's Republic of China on Dec. 8, 2020, and entitled "METHOD AND APPARATUS FOR PROCESSING INFORMATION OF BLOCKCHAIN NETWORK AND NODE DEVICE", all of which are incorporated herein by reference in their entirety.

FIELD OF THE TECHNOLOGY

This application relates to the field of blockchain technologies, and in particular, to a method and apparatus for processing information of a blockchain network, a device and a storage medium.

BACKGROUND OF THE DISCLOSURE

In the current blockchain network, especially the network based on Byzantine consensus algorithm, the speed that a consensus node processes messages depends on the resources of the node and the network transmission speed. In the whole blockchain consensus network, the resources may be different and the network resources may be different, resulting in different speed of processing messages at each consensus node. Moreover, in general, message transfer between known consensus nodes is usually one-time, and the consensus nodes need to follow strict protocol rules when processing consensus validation messages, for example, only processing consensus validation messages with the same height as their own node blocks. All these factors may cause the consensus process to be stuck and fail to provide external services. Therefore, how to effectively perform consensus validation in the blockchain network to ensure the reliability of the blockchain network has become a hot issue in today's research.

SUMMARY

The embodiments of this application provide a method and apparatus for processing information of a blockchain network, a device and a storage medium, which can improve the reliability of the blockchain network.

In one aspect, an embodiment of this application provides a method for processing information of a blockchain network. The blockchain network includes a target consensus node. The method includes:
  while performing, by the target consensus node, consensus validation on a first block, in accordance with a determination that a target consensus validation message for performing consensus validation on a second block is received:
  in accordance with a determination that the target consensus validation message meets a cache condition according to block attribute information of the second block: storing the target consensus validation message into a message cache pool corresponding to the target consensus node; and
  in accordance with a determination that the consensus validation on the first block is completed, performing consensus validation on the second block based on the target consensus validation message in the message cache pool.

In another aspect, an embodiment of this application provides an apparatus for processing information of a blockchain network. The apparatus includes:
  a receiving unit configured to, while performing, by the target consensus node, consensus validation on a first block, receive a target consensus validation message for performing consensus validation on a second block;
  a processing unit configured to determine whether the target consensus validation message meets a cache condition according to block attribute information of the second block; and
  a storage unit configured to, in accordance with a determination that the target consensus validation message meets the cache condition, store the target consensus validation message into a message cache pool corresponding to the target consensus node; and
  the processing unit being further configured to, in accordance with a determination that the consensus validation on the first block is completed, perform consensus validation on the second block based on the target consensus validation message in the message cache pool.

In another aspect, an embodiment of this application provides a computer device, which includes a processor adapted to implement a computer program; and a computer storage medium storing the computer program adapted to be loaded by the processor and execute the method for processing information of a blockchain network.

In another aspect, an embodiment of this application provides a computer storage medium. The computer storage medium stores a computer program, the computer program, when executed by a processor, being configured to perform the method for processing information of a blockchain network.

In another aspect, an embodiment of this application provides a computer program product or a computer program, the computer program product including a computer program, the computer program being stored in a computer-readable storage medium. A processor of a computer device reads the computer program from the computer storage medium, and the processor executes the computer program, causing the computer device to perform the method for processing information of a blockchain network.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

Technical solutions in embodiments of this application are clearly and completely described below with reference to the accompanying drawings in the embodiments of this application.

An embodiment of this application provides a scheme for processing information, which is applied to a blockchain network. While performing, by a target consensus node in the blockchain network, consensus validation on a first block, in accordance with a determination that a target consensus validation message for validating a second block is received, caching the target consensus validation message when the target consensus validation message meets a cache condition. In accordance with a determination that the consensus validation on the first block is completed, extracting the target consensus validation message from the cache, and validating the second block based on the target consensus validation message. The scheme for processing information provided by the embodiment of this application can ensure that the blockchain network service can be continuously provided to the outside under the situation of the blockchain asynchronous network, and improve the reliability of the blockchain network.

Figure 1:
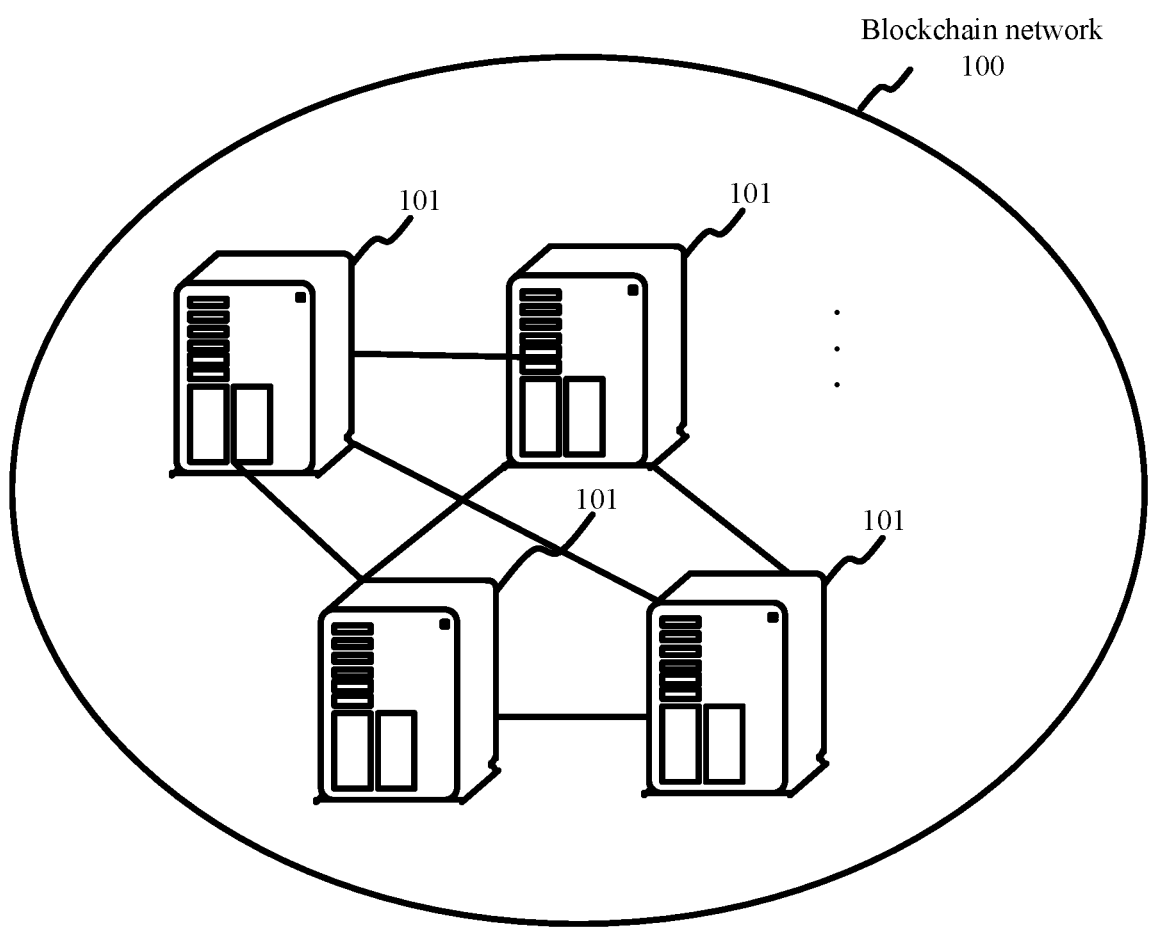
FIG. 1 is a schematic structural diagram of a blockchain network according to an embodiment of this application.

In an embodiment, the blockchain network can be understood as a data sharing system for data sharing between nodes. Referring to FIG. 1, it is a schematic structural diagram of a blockchain network according to an embodiment of this application. 100 represents a blockchain network. The blockchain network 100 may include a plurality of nodes 101. The plurality of nodes 101 may be terminal devices or servers accessing the blockchain network 100. The terminal may be a smart phone, a tablet computer, a notebook computer, a desktop computer, a smart speaker, a smart watch, or a smart vehicle-mounted terminal. The server may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

In an embodiment, each node 101 in the blockchain network 100 can receive information inputted into the blockchain network 100 during normal operation, and maintain shared data in the blockchain network based on the received input information. To ensure the interchange of information in the blockchain network, there may be information connections among nodes 101 in the blockchain network, and the nodes may transmit information through the information connections. For example, in accordance with a determination that any node 101 in the blockchain network receives inputted information, other nodes 101 in the blockchain network obtain the inputted information according to a consensus algorithm, and store the inputted information as data in shared data, so that data stored in all nodes 101 in the blockchain network is consistent.

Each node 101 in the blockchain network has its corresponding node identifier (ID), and each node 101 in the blockchain network can store the node ID of other nodes 101 in the blockchain network, so as to maintain a node ID list as described in the following table according to the node IDs of other nodes 101, and store the node name and node ID in the node ID list correspondingly. A node identifier may be an Internet Protocol (IP) address and any other type of information capable of identifying the node. IP addresses in Table 1 are only used as an example for description.

TABLE 1

| Node name | Node ID |
| --- | --- |
| Node 1 | 117.114.151.174 |
| Node 2 | 117.116.189.145 |
| ... | ... |
| Node N | 119.123.789.258 |

In an embodiment, the nodes included in the blockchain network include a routing function and various applications. The routing function is the basic function that the nodes in the blockchain network are required to have. It is used to support the communication between the nodes. The above-mentioned multiple nodes can share the data inputted into the blockchain network, which is realized by relying on the routing function of the nodes.

The applications include wallets, shared ledgers, smart contracts and blockchains. The wallets are used to provide a function for conducting transactions of electronic money. The shared ledgers are used to provide a function of storing, querying and modifying data and the like. The smart contracts are computerized protocols, which can execute the terms of a certain contract and are implemented by the codes deployed on the shared ledgers when certain conditions are met, for example, for querying the logistics status of the goods purchased by the buyer, and transferring the buyer's electronic money to the address of the merchant after the buyer signs after receiving the goods. The blockchains include a series of blocks successively connected according to the generated time sequence.

Based on the functions of the nodes in the blockchain described above, according to the functions of each node 101, the plurality of nodes 101 in the blockchain network 100 can be divided into the following types: light nodes, routing nodes, consensus nodes, and full nodes. The light nodes refer to nodes with wallets, routing functions and blockchains. The routing nodes refer to nodes with only routing functions and blockchains. The consensus nodes refer to nodes with consensus functions, routing functions and blockchains. The full nodes refer to nodes with wallet functions, routing functions, consensus functions, blockchains and smart contract functions. It is to be understood that when full nodes have a consensus function, full nodes may also be consensus nodes. In the embodiment of this application, the above scheme for processing information may be executed by a target consensus node, which refers to any one of a plurality of consensus nodes included in the blockchain network.

Figure 2:
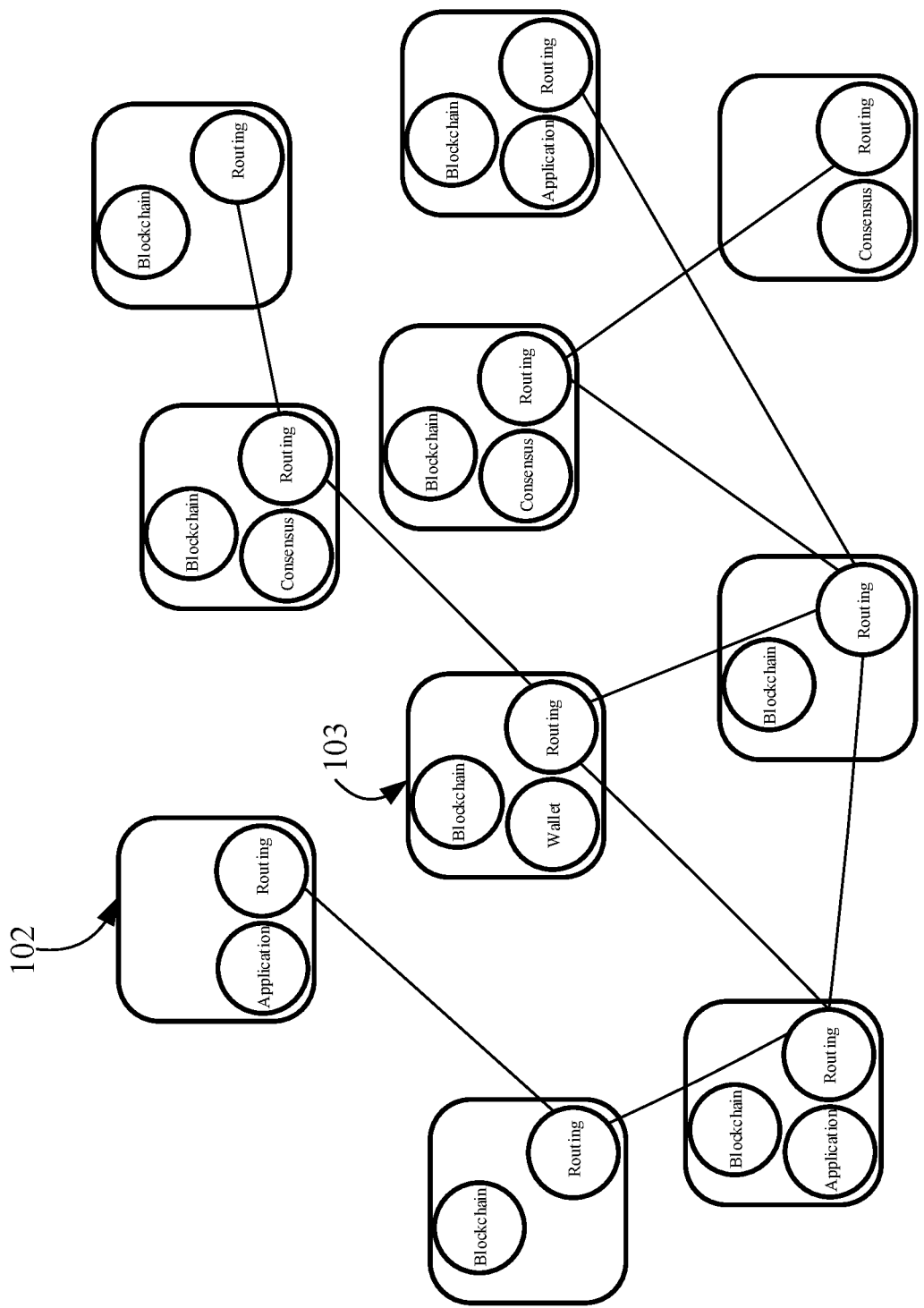
FIG. 2 is a schematic structural diagram of another blockchain network according to an embodiment of this application.

Based on the above description, the embodiment of this application provides a schematic structural diagram of another blockchain network, as illustrated in FIG. 2. FIG. 2 illustrates functions of each node. For example, an all node 102 has a routing function and all application functions. For another example, a light node 103 has a wallet function, a routing function, and blockchains stored therein.

Figure 3:
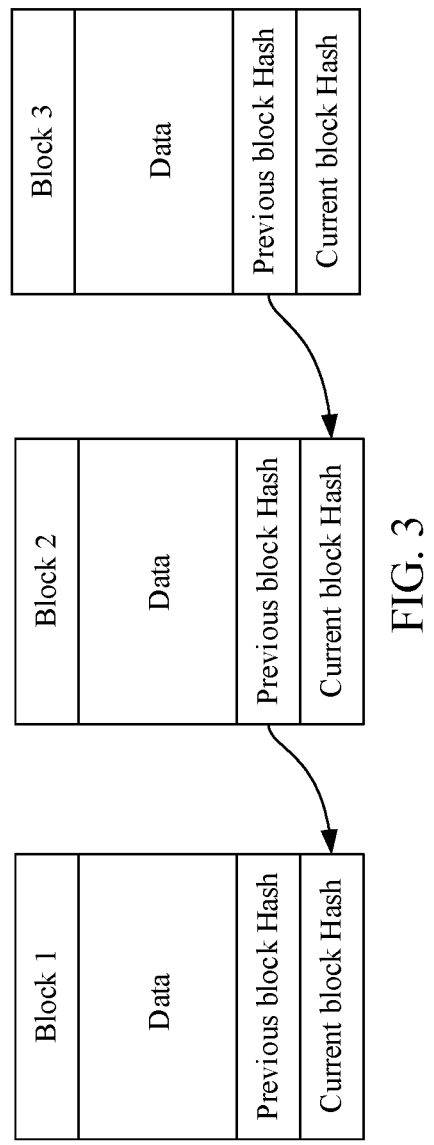
FIG. 3 is a structural diagram of a blockchain according to an embodiment of this application.

As can be seen from FIG. 2 above, each node in the blockchain network stores the same blockchain. A blockchain is composed of a plurality of blocks, as illustrated in FIG. FIG. 3, which is a schematic structural diagram of a blockchain according to an embodiment of this application. The blockchain illustrated in FIG. 3 may include a plurality of blocks. Each block includes the hash value of the current block and the hash value of the previous block. All blocks are connected through the hash values to form a blockchain. A blockchain is a decentralized database essentially, and is a series of associated data blocks generated by using a cryptographic method. Each data block includes related information, and is configured to verify the validity (anti-counterfeiting) of the information of the data block, and generate a next block.

In an embodiment, before each block on the blockchain is added to the blockchain, the consensus node needs to perform consensus validation on it, and the block can be added to the blockchain after the consensus validation passes. Exemplarily, there is a consensus algorithm running in the blockchain network, and each consensus node performs consensus validation on the block based on the consensus algorithm running in the blockchain network.

Without losing generality, taking the Byzantine consensus algorithm as an example, the whole process of block validation by the Byzantine consensus algorithm may include a block proposal phase, a pre-vote phase, and a pre-commit phase. The flow of these three phases is driven by consensus validation messages such as proposal messages, pre-vote message and pre-commit messages.

Specifically, there are two trigger conditions for any consensus node from the block proposal phase to the pre-vote phase. One is that a proposal message is received within a preset time. The other is that a proposal message is not received after a preset time.

When in the block proposal phase, in accordance with a determination that the proposal message for proposing the first block is received within a preset time, it enters the pre-vote phase. After it enters the pre-vote phase, any consensus node performs voting on the received proposal message, generates a pre-vote message, and broadcasts the pre-vote message to other consensus nodes. If the number of the pre-vote message received by any consensus node from other consensus nodes in the pre-vote phase meets a first number threshold, it enters the pre-commit phase. When in the pre-commit phase, in accordance with a determination that the number of the pre-commit messages received by any node from other consensus nodes meets a second number threshold, it is determined that the validation on the block is completed.

Exemplarily, both the first number threshold and the second number threshold may refer to ⅔ of the total number of consensus nodes. In the pre-vote phase, in accordance with a determination that the number of pre-vote messages received by any consensus node from other consensus nodes does not meet the first number threshold, the consensus node may wait all the time, or use a timeout method to enter the pre-commit phase. In the embodiment of this application, it is assumed that any consensus node will wait for a sufficient number of pre-vote messages before entering the pre-commit phase.

Similarly, in the pre-commit phase, in accordance with a determination that the number of the pre-commit messages received by any consensus node from other consensus nodes does not meet the second number threshold, the consensus node may wait until a sufficient number of pre-commit messages is received, or enter the timeout process. In the embodiment of this application, it is assumed that any consensus node will always wait for a sufficient number of pre-commit messages to complete the consensus validation on the block.

The flow of the plurality of consensus nodes in the blockchain network in the above three phases is asynchronous, and the speed is not the same. Especially when proposing a new block, it is probable that some consensus nodes have completed the above three phases and entered the process of consensus validation on the new block, but some nodes are still processing the logic of consensus validation on the previous block.

The node that has performed consensus validation on the new block will broadcast the consensus validation message for the new block, while the consensus node that continues to process the logic of consensus validation on the previous block, in accordance with a determination of receiving the consensus validation message for the new block, will consider that the consensus validation message does not match its current consensus validation process and discard the consensus validation message for the new block.

After the consensus node completes the consensus validation on the previous block, it also enters the consensus validation process of the new block. However, since the consensus node has discarded the consensus validation message for the new block, and the message transfer between the consensus nodes is usually one-time, the Byzantine consensus algorithm requires storage in the entire consensus network, because it needs to wait for enough consensus validation message, which causes the consensus validation to be stuck.

In consideration of this, an embodiment of this application provides a scheme for processing information applied to the blockchain network. While performing, by any consensus node in the blockchain network, consensus validation on a first block, in accordance with a determination that a target consensus validation message for performing validation on a second block is received, caching the target consensus validation message when the target consensus validation message meets a cache condition. In accordance with a determination that the consensus validation on the first block is completed, extracting the target consensus validation message from the cache, and validating the second block based on the target consensus validation message. The scheme for processing information provided by the embodiment of this application can ensure that the blockchain network service can be continuously provided to the outside under the situation of the blockchain asynchronous network, and improve the reliability of the blockchain network.

Figure 4:
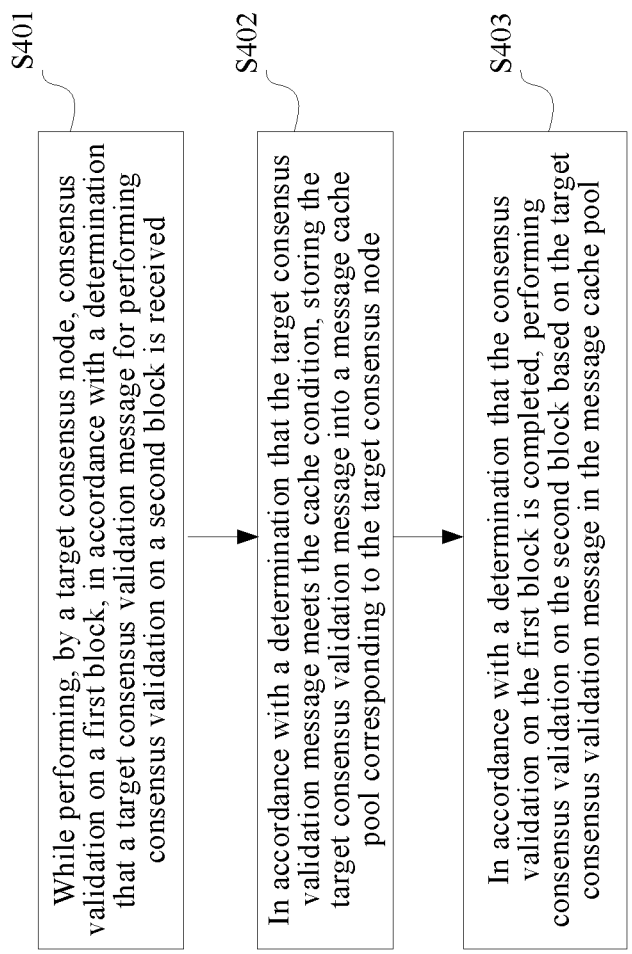
FIG. 4 is a flowchart of a method for processing information of a blockchain network according to an embodiment of this application.

Based on the above scheme for processing information applied to the blockchain network, an embodiment of this application provides a method for processing information of a blockchain network. Referring to FIG. 4, it is a flowchart of the method for processing information of the blockchain network according to the embodiment of this application. The method for processing information illustrated in FIG. 4 is executed by a computer device, for example, by a target consensus node, which is any one of a plurality of consensus nodes included in the blockchain network, such as node 101 as a consensus node in FIG. 1. The method for processing information illustrated in FIG. 4 includes the following steps:

Step S401: While performing, by the target consensus node, consensus validation on a first block, in accordance with a determination that a target consensus validation message for performing consensus validation on a second block is received, determine whether the target consensus validation message meets a cache condition according to block attribute information of the second block.

From the above description, it can be seen that the validation performed by any consensus node on any block includes a block proposal phase, a pre-vote phase and a pre-commit phase. The consensus validation performed by the target consensus node on the first block is no exception. Specifically, the process that the target consensus node performs consensus validation on the first block may include a block proposal phase, a pre-vote phase and a pre-commit phase.

When in the block proposal phase, in accordance with a determination that a proposal message for proposing the first block is received within a preset time, it enters the pre-vote phase, the target node performs vote processing on the proposal message to obtain a pre-vote message, and broadcasts the pre-vote message to other consensus nodes; when in the pre-vote phase, in accordance with a determination that the number of the pre-vote messages received by the target consensus node from the other consensus nodes meets a first number threshold, it enters the pre-commit phase; and when in the pre-commit phase, in accordance with a determination that the number of the pre-commit messages received by the target consensus node from the other consensus nodes meets a second number threshold, it is determined that the consensus validation on the first block is completed.

Exemplarily, in step S401, the process of performing consensus validation on the first block may refer to any one of the block proposal phase, the pre-vote phase and the pre-commit phase.

While performing, by the target consensus node, consensus validation on the first block, in accordance with a determination that a target consensus validation message for performing consensus validation on a second block is received, the target consensus validation message is not directly discarded, but whether the target consensus validation message meets a cache condition is determined according to the block attribute information of the second block; in accordance with a determination that the target consensus node meets the cache condition, storing the target consensus validation message in a message cache pool corresponding to the target consensus node through step S402.

In an embodiment, the block attribute information of the second block includes the block height of the second block, and determining whether the target consensus validation message meets the cache condition according to the block attribute information of the second block includes: determining a height difference between the block height of the second block and the block height of the first block; and in accordance with a determination that the height difference is less than or equal to a height difference threshold, determining that the target consensus validation message meets the cache condition.

The height difference threshold may be determined by the target consensus node according to the transmission speed of the current blockchain network and the resource condition of the target consensus node. The height difference threshold is used to indicate that under the current network transmission speed and the resource condition of the target consensus node, the consensus validation process, performed by the target consensus node, which lags behind by the height difference threshold of blocks can catch up.

Therefore, in accordance with a determination that the height difference between the block height of the second block and the block height of the first block is less than or equal to the height difference threshold, it is not necessary to discard the target consensus validation message for performing consensus validation on the second block, but only to store the target consensus validation message. After the validation on the first block is completed, the stored target consensus validation messages will be processed in turn.

From the above description, it can be seen that the consensus validation message generated by the consensus validation process for any block may include a block proposal message, a pre-vote message and a pre-commit message. Similarly, the target consensus validation message received by the target consensus node for performing consensus validation on the second block may include any one or more of target proposal message, target pre-vote message and target pre-commit message for proposing the second block.

It is to be understood that each consensus node in the blockchain network has the right to make a block proposal, but not the blocks proposed by each consensus node will pass the consensus validation. If a block proposed by a consensus node fails to pass the consensus validation, a next consensus node in the consensus node set (called the consensus governance committee) will continue to propose the block, and each consensus node will propose the block in turn.

Taking the second block as an example, in accordance with a determination that the second block is proposed for the first time, the consensus node that proposes the second block can be the first consensus node. At this time, the consensus view ID corresponding to the second block is n, and n may be any integer. In accordance with a determination that the consensus validation on the second block fails, the second block needs to be proposed by a second consensus node different from the first consensus node. At this time, a consensus view ID corresponding to the second block is n+1.

Based on the description above, in addition to the block height of the second block, the block attribute information of the second block may further include a consensus view ID corresponding to the second block, and the determining whether the target consensus validation message meets the cache condition according to the block attribute information of the second block includes: in accordance with a determination that the block height of the second block is the same as the block height of the first block and the target consensus validation message is a target proposal message, acquiring a consensus view difference between the consensus view ID corresponding to the second block and the consensus view ID corresponding to the first block; and in accordance with a determination that the consensus view difference is less than or equal to a consensus view difference threshold, determining that the target proposal message meets the cache condition. From the description above, it can be seen that the target proposal message refers to a proposal message for proposing the second block generated in the block proposal phase that consensus validation is performed on the second block.

In summary, in the embodiment of this application, in accordance with a determination that the height difference between the block height of the second block and the block height of the first block is less than or equal to the height difference threshold, the target consensus validation message is stored regardless of whether the target consensus validation message is target proposal message, target pre-vote message or target pre-commit message. However, in accordance with a determination that the block height of the second block matches (e.g., is the same as) the block height of the first block, the target consensus validation message is the target proposal message and the consensus view difference between the consensus view ID of the first block and the consensus view ID of the second block is less than or equal to the consensus view difference threshold, it can also be stored; in accordance with a determination that it is target pre-vote message or target pre-commit message, it does not need to be stored.

Step S402: In accordance with a determination that the target consensus validation message meets the cache condition, store the target consensus validation message into a message cache pool corresponding to the target consensus node.

In an embodiment, in order to improve the reliability of the blockchain network and prevent the consensus process on the block from being stuck, the embodiments of this application may introduce a message cache pool for each consensus node, and the message cache pool corresponding to each consensus node may be a message cache component. In accordance with a determination that it is determined that the target consensus validation message for performing consensus validation on the second block meets the cache condition, the target consensus node stores the target consensus validation message into a message cache pool corresponding to the target consensus node.

In an embodiment, storing the target consensus validation message into the message cache pool corresponding to the target consensus node may be implemented as follow: relationally storing the target consensus validation message, the block height of the second block and the consensus view ID of the second block, so that consensus validation can be performed on the second block based on the target consensus validation message. Assuming that the block height of the second block is 3 and the consensus view ID of the second block is 1, the mode of storing the target consensus validation message into the message cache pool may be: block height 3—consensus view ID 1—target proposal message; and for another example, block height 3—consensus view ID 1—target pre-vote message.

In an embodiment, the target consensus node stores the target consensus validation message into the message cache pool corresponding to the target consensus node through a message writing component. The message writing component may include any one of a proposal message writing component, a pre-vote message writing component and a pre-commit message writing component.

In the specific implementation, in accordance with a determination that the target consensus validation message is the target proposal message, the target consensus node can store the target consensus validation message into the message cache pool corresponding to the target consensus node through the proposal message writing component; in accordance with a determination that the target consensus validation message is the target pre-vote message, the target consensus node can store the target consensus validation message into the message cache pool corresponding to the target consensus node through the pre-vote message writing component; in accordance with a determination that the target consensus validation message is the target pre-commit message, the target consensus node can store the target consensus validation message into the message cache pool corresponding to the target consensus node through the pre-commit message writing component.

Step S403: After the consensus validation on the first block is completed, perform consensus validation on the second block based on the target consensus validation message in the message cache pool.

In an embodiment, after the target consensus node completes the consensus validation on the first block is completed, the target consensus validation message may be extracted from the message cache pool. It is to be understood that the number of the second blocks may be one or more, and the number of the target consensus validation message may also be one or more. The implementation of the target consensus node performing consensus validation on the second block based on the target consensus validation message extracted from the message cache pool may include:

determining a target second block with the smallest block height in the plurality of second blocks; acquiring a target consensus validation message corresponding to the target second block; in accordance with a determination that the target consensus validation message is target proposal message, performing vote processing on the target proposal message to generate a pre-vote message, and broadcasting the pre-vote message to other consensus nodes; in accordance with a determination that the target consensus validation message is a target pre-vote message, determining whether the number of the target pre-vote messages meets a first number threshold; in accordance with a determination that the number of the target pre-vote messages does not meet the first number threshold, continuing to wait for the target pre-vote message; in accordance with a determination that the number of the target pre-vote message meets the first number threshold, generating a pre-commit message and broadcasting the generated pre-commit message to other consensus nodes in the consensus network; in accordance with a determination that the target consensus validation message is a target pre-commit message, determining whether the number of the received target pre-commit messages meets the second number threshold; in accordance with a determination that the number of the received target pre-commit messages does not meet the second number threshold, continuing to wait for the target pre-commit message; in accordance with a determination that the number of the received target pre-commit messages meets the second number threshold, determining that the validation on the target second block passes and adding the target second block to the blockchain.

In an embodiment, in order to release the storage space in the message cache pool in time, the target consensus node may delete the target consensus validation message from the message cache pool corresponding to the target consensus node after performing the consensus validation on the second block based on the target consensus validation message.

In the embodiment of this application, While performing, by a target consensus node, consensus validation on a first block, in accordance with a determination that a target consensus validation message for performing consensus validation on a second block is received, whether the target consensus validation message meets a cache condition is determined according to the block height of the second block; in accordance with a determination that the target consensus validation message meets the cache condition, the target consensus validation message is stored into a message cache pool corresponding to the target consensus node; and after the target consensus node completes the consensus validation on the first block, consensus validation is performed on the second block based on the target consensus validation message in the message cache pool. In the above method for processing information, in the process of performing consensus validation on a current block, in accordance with a determination that a consensus validation message for a new block is received, the consensus validation message is not directly discarded but stored in accordance with a determination that the consensus validation message meets the cache condition, so as to validate the new block based on the stored consensus validation message after the validation on the current block is completed. In this way, it can effectively avoid the situation that the consensus process is stuck since the consensus validation message that is highly inconsistent with the current block is directly discarded, and improve the reliability of the blockchain network.

Figure 5:
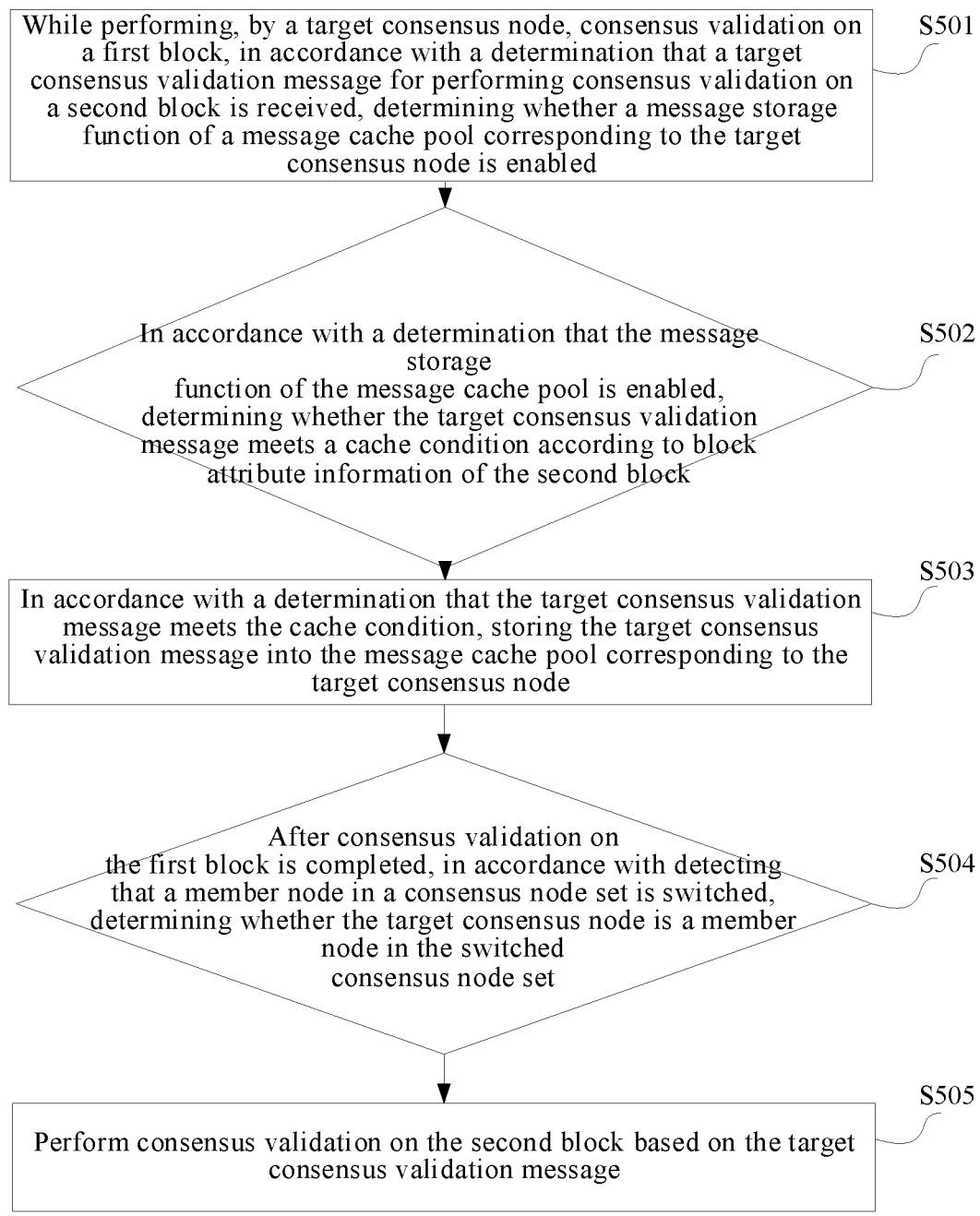
FIG. 5 is a flowchart of another method for processing information of a blockchain network according to an embodiment of this application.

Based on the above method for processing information, an embodiment of this application further provides another method for processing information in a blockchain network. Referring to FIG. 5, it is a flowchart of another method of for processing information in a blockchain network according to an embodiment of this application. The method for processing information illustrated in FIG. 5 can be executed by a target consensus node, which is a member node in a consensus node set, such as node 101 as a consensus node in FIG. 1. The method for processing information includes the following steps:

Step S501: While performing, by a target consensus node, consensus validation on a first block, in accordance with a determination that a target consensus validation message for performing consensus validation on a second block is received, determine whether a message storage function of a message cache pool corresponding to the target consensus node is enabled.

In an embodiment, considering the efficiency of block consensus validation in the blockchain network and the storage ledger synchronization function in the blockchain network, the range of cached messages in the message cache pool of the target consensus node can be limited. For example, the message cache pool of the target consensus node can only cache consensus validation messages of a preset number of blocks at most.

Based on this, in accordance with a determination that consensus validation messages of a preset number of blocks have been stored in the target consensus node, the target consensus node can temporarily disable the message storage function of the message cache pool. In accordance with a determination that the message storage function is disabled, the target consensus node cannot store the consensus validation message into the message cache pool. At this time, in accordance with a determination that the target consensus node receives a consensus validation message for a new block, it can only discard it. After the target consensus node validates the corresponding block according to the consensus validation message stored in the message cache pool, part of the storage space of the message cache pool is released, then the message storage function of the message cache pool can be enabled at this time.

Step S502: In accordance with a determination that the message storage function of the message cache pool is enabled, determine whether the target consensus validation message meets a cache condition according to the block attribute information of the second block.

It is to be understood that the power consumption required to determine whether the message storage function of the message cache pool is enabled is less than the power consumption required to determine whether the target consensus validation message meets the cache condition. Therefore, in order to reduce the power consumption of the target consensus node, it is necessary to determine whether the message storage function of the message cache pool is enabled before determining whether the target consensus validation message meets the cache condition. In accordance with a determination that the message storage function is enabled, it indicates that the target consensus validation message can be stored in the message cache pool in accordance with a determination that it meets the cache condition. Therefore, it needs to further determine whether the target consensus validation message meets the cache condition. In accordance with a determination that the message storage function is disabled, it indicates that even if the target consensus validation message meets the cache condition, it will not be stored in the message cache pool, so the target consensus node does not need to waste extra power consumption to detect.

Step S503: In accordance with a determination that the target consensus validation message meets the cache condition, store the target consensus validation message into the message cache pool corresponding to the target consensus node.

In an embodiment, for some feasible implementations included in step S503, a reference can be made to the specific description of relevant steps in the embodiment illustrated in FIG. 4, which will not be repetitively described here.

Step S504: After the consensus validation on the first block is completed, in accordance with a determination that it is detected that a member node in the consensus node set is switched, determine whether the target consensus node is a member node in the switched consensus node set.

Step S505: In accordance with a determination that the target consensus node is a member node in the switched consensus node set, perform consensus validation on the second block based on the target consensus validation message.

From the above description, it can be seen that, in the process that consensus validation is performed on the first block, the target consensus node is a member node in the consensus node set, that is, the target consensus node has the right to perform consensus validation on the block. Considering that after the consensus validation on the first block is completed, the member nodes in the consensus node set may change, and the target consensus node may not be a member node in the changed consensus node set, at this time the target consensus node cannot perform consensus validation on the second block. In other words, the consensus validation performed by the target consensus node to the second block is invalid.

Based on this, in order to reduce unnecessary power consumption of the target consensus node, after the consensus validation on the first block is completed in step S504, in accordance with a determination that it is detected that a member node in the consensus node set is switched, whether the target consensus node is a member node in the switched consensus node set is determined; in accordance with a determination that the target consensus node is a member node in the switched consensus node set, step S505 is executed, that is, consensus validation is performed on the second block according to the target consensus validation message stored in the message cache pool; in accordance with a determination that the target consensus node is not a member node in the switched consensus node set, the target consensus validation message stored in the message cache pool is deleted. Further, a block synchronization request may be transmitted to the other consensus nodes to instruct the other consensus nodes to synchronize the second block after validation to the target consensus node.

In an embodiment, after the target consensus node stores the target consensus validation message into the message cache pool corresponding to the target consensus node, it can detect whether consensus validation messages of a preset number of blocks have been stored in the current message cache pool; in accordance with a determination that the consensus validation messages of a preset number of blocks have been stored in the current message cache pool, the message storage function of the message cache pool corresponding to the target consensus node may be disabled, in order to prevent the messages of a plurality of blocks to be validated from being accumulated at the target consensus node and resulting in a decrease in block validation efficiency.

After the message storage function of the message cache pool is disabled, in accordance with a determination that a consensus validation message for a third block is received, the consensus validation message for the third block can be directly discarded.

In an embodiment, after the target consensus node completes the consensus validation on the second block according to the target consensus validation message, it can catch up with the third block through a ledger synchronization module in the blockchain network. Specifically, the message storage function of the message cache pool may be enabled, and the third block after the consensus validation may be synchronized from other consensus nodes, that is, a block synchronization request is transmitted to the other consensus nodes to instruct the other consensus nodes to synchronize the third block after the validation to the target consensus node.

In the embodiment of this application, in the process of performing, by the target node, consensus validation on the first block, in accordance with a determination that the target consensus validation message for performing consensus validation on the second block is received, whether the message storage function of the message cache pool corresponding to the target consensus node is enabled is determined; in accordance with a determination that the message storage function of the message cache pool is enabled, whether the target consensus validation message meets the cache condition is determined, and in accordance with a determination that the target consensus validation message meets the cache condition, the target consensus validation message is stored into the message cache pool. In this way, unnecessary overhead of the target consensus node can be reduced.

Then, after the target consensus node completes the consensus validation on the first block, consensus validation may be performed on the second block based on the target consensus validation message stored in the message cache pool. However, considering that after the consensus validation on the first block is completed, the member nodes in the consensus node set may change, and the target consensus node may no longer belong to the consensus node set. In accordance with a determination that the target consensus node no longer belongs to the consensus node set, there is no need to perform consensus validation on the second block. Based on this, in order to reduce the power consumption of the target consensus node and improve the effectiveness of block validation, the target consensus node firstly determines whether a member node in the consensus node set has been switched before performing consensus validation on the second block according to the target validation message. In accordance with a determination that a switch occurs, whether the target consensus node is a member node in the switched consensus node set is determined. In accordance with a determination that the target consensus node is a member node in the switched consensus node set, the target consensus node then performs consensus validation on the second block according to the target consensus validation message.

Figure 6:
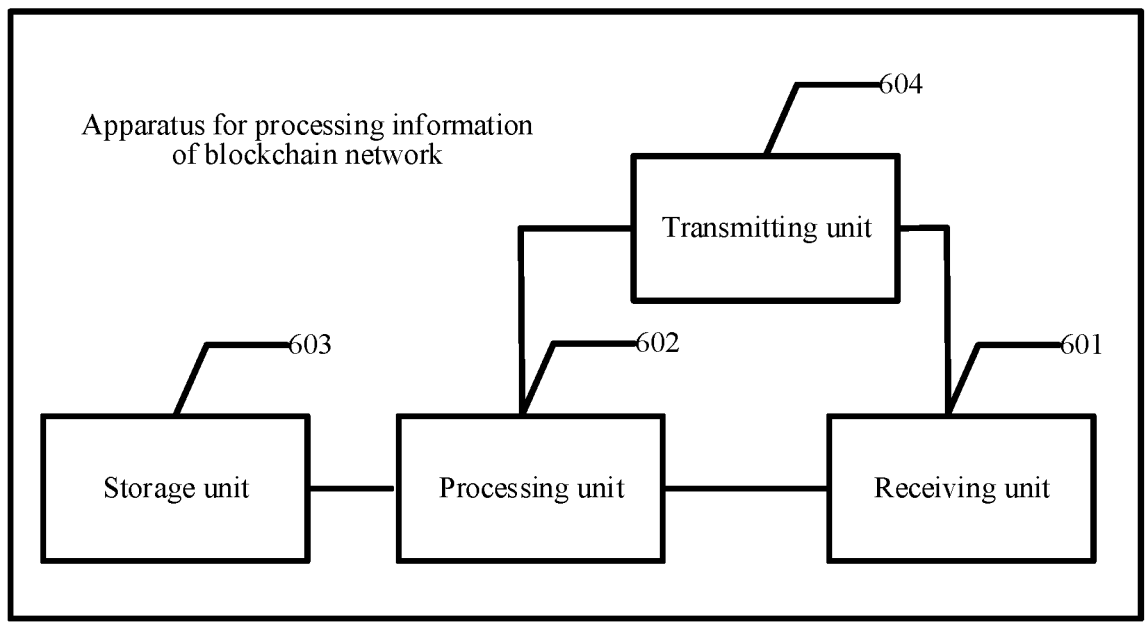
FIG. 6 is a schematic structural diagram of an apparatus for processing information of a blockchain network according to an embodiment of this application.

Based on the above method for processing information of a blockchain network, an embodiment of this application provides an apparatus for processing information of a blockchain network. Referring to FIG. 6, it is a schematic structural diagram of an apparatus for processing information in a blockchain network according to an embodiment of this application. The apparatus for processing information illustrated in FIG. 6 may be a computer program (including program code) running in a computer device. For example, the apparatus for processing information is application software. The apparatus for processing information illustrated in FIG. 6 may also be a hardware apparatus. The apparatus for processing information illustrated in FIG. 6 may be configured to execute the methods for processing information in the blockchain network illustrated in FIG. 4 and FIG. 5. The apparatus for processing information illustrated in FIG. 6 may include:

a receiving unit 601 configured to, while performing, by the target consensus node, consensus validation on a first block, receive a target consensus validation message for performing consensus validation on a second block;

a processing unit 602 configured to determine whether the target consensus validation message meets a cache condition according to block attribute information of the second block; and a storage unit 603 configured to, in accordance with a determination that the target consensus validation message meets the cache condition, store the target consensus validation message into a message cache pool corresponding to the target consensus node.

The processing unit 602 is further configured to, after the consensus validation on the first block is completed, perform consensus validation on the second block based on the target consensus validation message in the message cache pool.

In an embodiment, the process of consensus validation includes a block proposal phase, a pre-vote phase and a pre-commit phase; performing, by the target consensus node, consensus validation on the first block includes:

in the block proposal phase, in accordance with a determination that a proposal message for proposing the first block is received within a preset time, entering the pre-vote phase, performing, by the target consensus node, vote processing on the proposal message to obtain a pre-vote message, and broadcasting the pre-vote message to other consensus nodes in the blockchain network;

in the pre-vote phase, in accordance with a determination that the number of the pre-vote messages received by the target consensus node from the other consensus nodes meets a first number threshold, entering the pre-commit phase; and in the pre-commit phase, in accordance with a determination that the number of pre-commit messages received by the target consensus node from the other consensus nodes meets a second number threshold, determining that the consensus validation on the first block is completed.

In an embodiment, the block attribute information of the second block includes the block height of the second block, and the processing unit 602 determines whether the target consensus validation message meets the cache condition according to the block attribute information of the second block by executing the following steps:

determining a height difference between the block height of the second block and the block height of the first block; and in accordance with a determination that the height difference is less than or equal to a height difference threshold, determining that the target consensus validation message meets the cache condition.

In an embodiment, the block attribute information of the second block includes the block height of the second block and a consensus view ID corresponding to the second block, and the processing unit 602 determines whether the target consensus validation message meets the cache condition according to the block attribute information of the second block by executing the following steps:

in accordance with a determination that the block height of the second block is the same as the block height of the first block and the target consensus validation message is a target proposal message, acquiring a consensus view difference between the consensus view ID corresponding to the second block and the consensus view ID corresponding to the first block, the target proposal message referring to a proposal message for proposing the second block generated in the block proposal phase that consensus validation is performed on the second block; and in accordance with a determination that the consensus view difference is less than or equal to a consensus view difference threshold, determining that the target proposal message meets the cache condition.

In an embodiment, in the process of performing, by the target consensus node, consensus validation on the first block, the target consensus node is a member node in a consensus node set; and after the consensus validation on the first block is completed, the processing unit 602 performs consensus validation on the second block based on the target consensus validation message in the message cache pool by executing the following steps:

after the consensus validation on the first block is completed, in accordance with a determination that it is detected that a member node in the consensus node set is switched, determining whether the target consensus node is a member node in the switched consensus node set; and in accordance with a determination that the target consensus node is a member node in the switched consensus node set, performing consensus validation on the second block based on the target consensus validation message in the message cache pool.

In an embodiment, the blockchain network further includes other consensus nodes, and the apparatus for processing information further includes a transmitting unit 604; the processing unit 602 is further configured to, in accordance with a determination that the target consensus node is not a member node in the switched consensus node set, delete the target consensus validation message stored in the message cache pool; and the transmitting unit 604 is configured to transmit a block synchronization request to the other consensus nodes to instruct the other consensus nodes to synchronize the second block after the consensus validation to the target consensus node.

In an embodiment, the processing unit 602 determines whether the target consensus validation message meets the cache condition according to the block attribute information of the second block by executing the following steps:

determining whether a message storage function of the message cache pool corresponding to the target consensus node is enabled; and in accordance with a determination that the message storage function of the message cache pool is enabled, determining whether the target consensus validation message meets the cache condition according to the block attribute information of the second block.

In an embodiment, after the target consensus validation message is stored in the message cache pool corresponding to the target consensus node, the processing unit 602 is further configured to, in accordance with a determination that consensus validation messages of a preset number of blocks have been stored in the message cache pool, disable the message storage function of the message cache pool; and in accordance with a determination that a consensus validation message for a third block is received, discard the consensus validation message for the third block.

In an embodiment, the processing unit 602 is further configured to, after the consensus validation is performed on the second block based on the target consensus validation message, delete the target consensus validation message from the message cache pool.

In an embodiment, the processing unit 602 is further configured to enable the message storage function of the message cache pool, and synchronize the third block after consensus validation from other consensus nodes.

According to an embodiment of this application, all steps in the methods for processing information illustrated in FIG. 4 and FIG. 5 may be executed by the units in the apparatus for processing information illustrated in FIG. 6. For example, step S401 in FIG. 4 may be executed by the receiving unit 601 and the processing unit 602 in the apparatus for processing information illustrated in FIG. 6, step S402 may be executed by the storage unit 603 in the apparatus for processing information illustrated in FIG. 6, and step S40 may be executed by the processing unit 602 in the apparatus for processing information illustrated in FIG. 6. For another example, step S501 in FIG. 5 may be executed by the receiving unit 601 and the processing unit 602 in the apparatus for processing information illustrated in FIG. 6, step S502 may be executed by the processing unit 602 in the apparatus for processing information illustrated in FIG. 6, step S503 may be executed by the storage unit 603 in the apparatus for processing information illustrated in FIG. 6, and steps S504 and S505 may be executed by the processing unit 602 in the apparatus for processing information illustrated in FIG. 6.

According to another embodiment of the present disclosure, the units of the information processing apparatus shown in FIG. 6 may be separately or wholly combined into one or several other units, or one (or more) of the units herein may further be divided into multiple units of smaller functions. In this way, same operations can be implemented, and implementation of the technical effects of this embodiment of the present disclosure is not affected. Division into such units is implemented based on logical functions. In practical applications, the functions of one unit may be implemented by a plurality of units instead, or the functions of a plurality of units may be implemented by one unit. In another embodiment of the present disclosure, the information processing apparatus may also include another unit. During practical application, these functions may also be cooperatively implemented by another unit and may be cooperatively implemented by multiple units.

According to another embodiment of this application, a computer program (including program code) that can perform the steps in the corresponding methods shown in FIG. 4 and FIG. 5 may be run on a general computing device, such as a computer, which include processing elements and storage elements such as a CPU, a RAM, and a ROM, to construct the information processing apparatus shown in FIG. 6, and implement the information processing method in the embodiments of this application. The computer program may be recorded in, for example, a computer-readable storage medium, and may be loaded into the foregoing computing device by using the computer-readable storage medium, and run in the computing device.

In the embodiment of this application, while performing, by a target consensus node, consensus validation on a first block, in accordance with a determination that a target consensus validation message for performing consensus validation on a second block is received, whether the target consensus validation message meets a cache condition is determined according to the block height of the second block; in accordance with a determination that the target consensus validation message meets the cache condition, the target consensus validation message is stored into a message cache pool corresponding to the target consensus node; and after the target consensus node completes the consensus validation on the first block, consensus validation is performed on the second block based on the target consensus validation message in the message cache pool. In the above method for processing information, in the process of performing consensus validation on a current block, in accordance with a determination that a consensus validation message for a new block is received, the consensus validation message is not directly discarded but stored in accordance with a determination that the consensus validation message meets the cache condition, so as to validate the new block based on the stored consensus validation message after the validation on the current block is completed. In this way, it can effectively avoid the situation that the consensus process is stuck since the consensus validation message that is highly inconsistent with the current block is directly discarded, and improve the reliability of the blockchain network.

Figure 7:
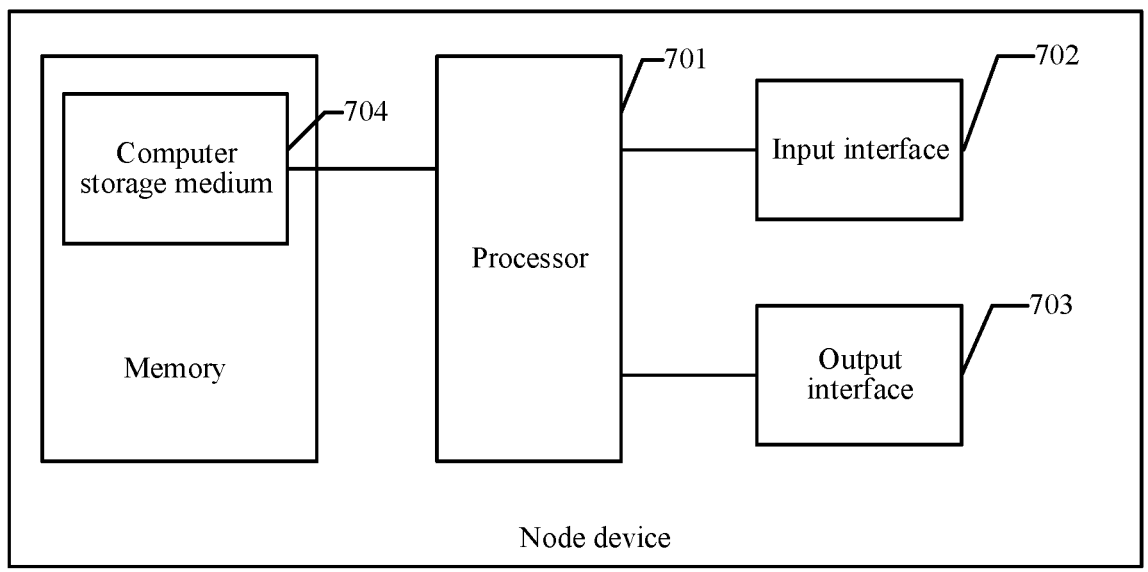
FIG. 7 is a schematic structural diagram of a computer device according to an embodiment of this application.

Based on the above method embodiments and apparatus embodiments, an embodiment of this application further provides a computer device, which may be a node device, such as the target consensus node described above. Referring to FIG. 7, it is a schematic structural diagram of a computer device according to an embodiment of this application. The computer device illustrated in FIG. 7 may include at least a processor 701, an input interface 702, an output interface 703, and a computer storage medium 704. The processor 701, the input interface 702, the output interface 703, and the computer storage medium 704 may be connected by using a bus or in another manner.

The computer storage medium 704 may be stored in a memory of the computer device. The computer storage medium 701 is configured to store a computer program. The computer program includes program instructions. The processor 701 is configured to execute the program instructions stored in the computer storage medium 704. As a computing core and control core of the computer device, the processor 701 (or referred to as a CPU) is suitable for implementing the computer program, specifically suitable for loading and executing:

while performing a target consensus node, consensus validation on a first block, in accordance with a determination that a target consensus validation message for performing consensus validation on a second block is received, determining whether the target consensus validation message meets a cache condition according to block attribute information of the second block; in accordance with a determination that the target consensus validation message meets the cache condition, storing the target consensus validation message into a message cache pool corresponding to the target consensus node; and after the consensus validation on the first block is completed, performing consensus validation on the second block based on the target consensus validation message in the message cache pool.

The embodiments of this application further provide a computer storage medium, and the computer storage medium is a memory device in a computer device and is configured to store programs and data. It may be understood that the computer storage medium herein may include an internal storage medium of the computer device and certainly may also include an extended storage medium supported by the computer device. The computer storage medium provides storage space, and the storage space stores an operating system of the computer device. Moreover, computer programs suitable for the processor 701 to load and execute are further stored in the memory space. These computer programs may be one or more computer programs (including program codes). The computer storage medium herein may be a high-speed RAM or a non-volatile memory, for example, at least one magnetic disk memory. In some embodiments, the computer storage medium may further be at least one computer storage medium located away from the foregoing processor.

In an embodiment, the computer storage medium may be loaded by the processor 701 and execute the computer program stored in the computer storage medium, so as to implement the corresponding steps of the methods for processing information in the blockchain network illustrated in FIG. 4 and FIG. 5. In the specific implementation, the computer program in the computer storage medium is loaded by the processor 701 and executes the following steps:

while performing, by a target consensus node, consensus validation on a first block, in accordance with a determination that a target consensus validation message for performing consensus validation on a second block is received, determining whether the target consensus validation message meets a cache condition according to block attribute information of the second block; in accordance with a determination that the target consensus validation message meets the cache condition, storing the target consensus validation message into a message cache pool corresponding to the target consensus node; and after the consensus validation on the first block is completed, performing consensus validation on the second block based on the target consensus validation message in the message cache pool.

In the embodiment of this application, while performing, by a target consensus node, consensus validation on a first block, in accordance with a determination that a target consensus validation message for performing consensus validation on a second block is received, whether the target consensus validation message meets a cache condition is determined according to the block height of the second block; in accordance with a determination that the target consensus validation message meets the cache condition, the target consensus validation message is stored into a message cache pool corresponding to the target consensus node; and after the target consensus node completes the consensus validation on the first block, consensus validation is performed on the second block based on the target consensus validation message in the message cache pool. In the above method for processing information, in the process of performing consensus validation on a current block, in accordance with a determination that a consensus validation message for a new block is received, the consensus validation message is not directly discarded but stored in accordance with a determination that the consensus validation message meets the cache condition, so as to validate the new block based on the stored consensus validation message after the validation on the current block is completed. In this way, it can effectively avoid the situation that the consensus process is stuck since the consensus validation message that is highly inconsistent with the current block is directly discarded, and improve the reliability of the blockchain network.

According to an aspect of this application, an embodiment of this application further provides a computer program product or a computer program, the computer program product or the computer program including a computer program, the computer program being stored in a computer-readable storage medium. The processor 701 reads the computer program from the computer-readable storage medium, and the processor 701 executes the computer program to cause the computer device to execute the method for processing information in the blockchain network illustrated in FIG. 3, specifically including the following steps:

while performing, by a target consensus node, consensus validation on a first block, in accordance with a determination that a target consensus validation message for performing consensus validation on a second block is received, determining whether the target consensus validation message meets a cache condition according to block attribute information of the second block; in accordance with a determination that the target consensus validation message meets the cache condition, storing the target consensus validation message into a message cache pool corresponding to the target consensus node; and after the consensus validation on the first block is completed, performing consensus validation on the second block based on the target consensus validation message in the message cache pool.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

A person of ordinary skill in the art may be aware that the units and algorithm steps in the examples described with reference to the embodiments of this application may be implemented by electronic hardware, computer software, or a combination thereof. To clearly describe the interchangeability between the hardware and the software, the foregoing has generally described compositions and steps of each example according to functions. Whether the functions are executed by hardware or software depends on particular applications and design constraint conditions of the technical solutions. A person skilled in the art may use different methods to implement the described functions for each particular application, but it is not to be considered that the implementation goes beyond the scope of this application.

What is claimed is:

1. A method for processing information of a blockchain network, executed by a computer device, the blockchain network comprising a target consensus node, the method comprising:

while performing, by the target consensus node, consensus validation on a first block, in accordance with a determination that a target consensus validation message for performing consensus validation on a second block is received:

in accordance with a determination that the target consensus validation message meets a cache condition according to block attribute information of the second block:

storing the target consensus validation message into a message cache pool corresponding to the target consensus node; and in accordance with a determination that the consensus validation on the first block is completed, performing consensus validation on the second block based on the target consensus validation message in the message cache pool.

2. The method according to claim 1, wherein the consensus validation comprises a block proposal phase, a pre-vote phase and a pre-commit phase; and performing, by the target consensus node, the consensus validation on the first block comprises:

while in the block proposal phase, in accordance with a determination that a proposal message for proposing the first block is received within a preset time, entering the pre-vote phase; performing, by the target consensus node, vote processing on the proposal message to obtain a pre-vote message, and broadcasting the pre-vote message to other consensus nodes in the blockchain network;

while in the pre-vote phase, in accordance with a determination that the number of the pre-vote messages received by the target consensus node from the other consensus nodes meets a first number threshold, entering the pre-commit phase; and while in the pre-commit phase, in accordance with a determination that the number of pre-commit messages received by the target consensus node from the other consensus nodes meets a second number threshold, determining that the consensus validation on the first block is completed.

3. The method according to claim 1, wherein the block attribute information of the second block comprises the block height of the second block, and determining whether the target consensus validation message meets a cache condition comprises:

determining a height difference between the block height of the second block and the block height of the first block; and in accordance with a determination that the height difference is less than or equal to a height difference threshold, determining that the target consensus validation message meets the cache condition.

4. The method according to claim 1, wherein the block attribute information of the second block comprises the block height of the second block and a consensus view identifier (ID) corresponding to the second block, and determining whether the target consensus validation message meets a cache condition comprises:

in accordance with a determination that the block height of the second block matches the block height of the first block and the target consensus validation message is a target proposal message, acquiring a consensus view difference between the consensus view ID corresponding to the second block and a consensus view ID corresponding to the first block, wherein the target proposal message is a proposal message for proposing the second block generated in the block proposal phase in which consensus validation is performed on the second block; and in accordance with a determination that the consensus view difference is less than or equal to a consensus view difference threshold, determining that the target proposal message meets the cache condition.

5. The method according to claim 1, wherein the target consensus node is a member node in a consensus node set; and performing consensus validation on the second block based on the target consensus validation message in the message cache pool comprises:

in accordance with a determination that the consensus validation on the first block is completed, in accordance with detecting that a member node in the consensus node set is switched and that the target consensus node is a member node in the switched consensus node set, performing consensus validation on the second block based on the target consensus validation message in the message cache pool.

6. The method according to claim 5, wherein the blockchain network further comprises other consensus nodes, and the method further comprises:

in accordance with a determination that the target consensus node is not a member node in the switched consensus node set, deleting the target consensus validation message stored in the message cache pool; and transmitting a block synchronization request to the other consensus nodes to instruct the other consensus nodes to synchronize the second block after the consensus validation to the target consensus node.

7. The method according to claim 1, wherein determining whether the target consensus validation message meets a cache comprises:

in accordance with a determination that a message storage function of the message cache pool is enabled, determining whether the target consensus validation message meets the cache condition according to the block attribute information of the second block.

8. The method according to claim 7, in accordance with a determination that the target consensus validation message is stored in the message cache pool corresponding to the target consensus node, the method further comprises:

in accordance with a determination that consensus validation messages of a preset number of blocks have been stored in the message cache pool, disabling the message storage function of the message cache pool; and in accordance with a determination that a consensus validation message for a third block is received, discarding the consensus validation message for the third block.

9. The method according to claim 8, further comprising: In accordance with a determination that the consensus validation is performed on the second block based on the target consensus validation message, deleting the target consensus validation message from the message cache pool.

10. The method according to claim 9, in accordance with a determination that the consensus validation is performed on the second block based on the target consensus validation message, the method further comprises:

enabling the message storage function of the message cache pool, and synchronizing the third block after the consensus validation from other consensus nodes.

11. An electronic device, comprising:

one or more processors; and memory storing one or more programs, the one or more programs comprising instructions that, when executed by the one or more processors, cause the one or more processors to perform operations comprising:

while performing, by the target consensus node, consensus validation on a first block, in accordance with a determination that a target consensus validation message for performing consensus validation on a second block is received:

in accordance with a determination that the target consensus validation message meets a cache condition according to block attribute information of the second block:

storing the target consensus validation message into a message cache pool corresponding to the target consensus node; and in accordance with a determination that the consensus validation on the first block is completed, performing consensus validation on the second block based on the target consensus validation message in the message cache pool.

12. The electronic device according to claim 11, wherein the consensus validation comprises a block proposal phase, a pre-vote phase and a pre-commit phase; and performing, by the target consensus node, the consensus validation on the first block comprises:

while in the block proposal phase, in accordance with a determination that a proposal message for proposing the first block is received within a preset time, entering the pre-vote phase; performing, by the target consensus node, vote processing on the proposal message to obtain a pre-vote message, and broadcasting the pre-vote message to other consensus nodes in the blockchain network;

while in the pre-vote phase, in accordance with a determination that the number of the pre-vote messages received by the target consensus node from the other consensus nodes meets a first number threshold, entering the pre-commit phase; and while in the pre-commit phase, in accordance with a determination that the number of pre-commit messages received by the target consensus node from the other consensus nodes meets a second number threshold, determining that the consensus validation on the first block is completed.

13. The electronic device according to claim 11, wherein the block attribute information of the second block comprises the block height of the second block, and determining whether the target consensus validation message meets a cache condition comprises:

determining a height difference between the block height of the second block and the block height of the first block; and in accordance with a determination that the height difference is less than or equal to a height difference threshold, determining that the target consensus validation message meets the cache condition.

14. The electronic device according to claim 11, wherein the block attribute information of the second block comprises the block height of the second block and a consensus view identifier (ID) corresponding to the second block, and determining whether the target consensus validation message meets a cache condition comprises:
in accordance with a determination that the block height of the second block matches the block height of the first block and the target consensus validation message is a target proposal message, acquiring a consensus view difference between the consensus view ID corresponding to the second block and a consensus view ID corresponding to the first block, wherein the target proposal message is a proposal message for proposing the second block generated in the block proposal phase in which consensus validation is performed on the second block; and
in accordance with a determination that the consensus view difference is less than or equal to a consensus view difference threshold, determining that the target proposal message meets the cache condition.

15. The electronic device according to claim 11, wherein the target consensus node is a member node in a consensus node set; and performing consensus validation on the second block based on the target consensus validation message in the message cache pool comprises:
in accordance with a determination that the consensus validation on the first block is completed, in accordance with detecting that a member node in the consensus node set is switched and that the target consensus node is a member node in the switched consensus node set, performing consensus validation on the second block based on the target consensus validation message in the message cache pool.

16. The electronic device according to claim 15, wherein the blockchain network further comprises other consensus nodes, and the method further comprises:
in accordance with a determination that the target consensus node is not a member node in the switched consensus node set, deleting the target consensus validation message stored in the message cache pool; and
transmitting a block synchronization request to the other consensus nodes to instruct the other consensus nodes to synchronize the second block after the consensus validation to the target consensus node.

17. A non-transitory computer-readable storage medium, storing a computer program, the computer program, when executed by one or more processors of an electronic device, cause the one or more processors to perform operations comprising:
while performing, by the target consensus node, consensus validation on a first block, in accordance with a determination that a target consensus validation message for performing consensus validation on a second block is received:
in accordance with a determination that the target consensus validation message meets a cache condition according to block attribute information of the second block:
storing the target consensus validation message into a message cache pool corresponding to the target consensus node; and
in accordance with a determination that the consensus validation on the first block is completed, performing consensus validation on the second block based on the target consensus validation message in the message cache pool.

18. The non-transitory computer-readable storage medium according to claim 17, wherein the consensus validation comprises a block proposal phase, a pre-vote phase and a pre-commit phase; and performing, by the target consensus node, the consensus validation on the first block comprises:
while in the block proposal phase, in accordance with a determination that a proposal message for proposing the first block is received within a preset time, entering the pre-vote phase; performing, by the target consensus node, vote processing on the proposal message to obtain a pre-vote message, and broadcasting the pre-vote message to other consensus nodes in the blockchain network;
while in the pre-vote phase, in accordance with a determination that the number of the pre-vote messages received by the target consensus node from the other consensus nodes meets a first number threshold, entering the pre-commit phase; and
while in the pre-commit phase, in accordance with a determination that the number of pre-commit messages received by the target consensus node from the other consensus nodes meets a second number threshold, determining that the consensus validation on the first block is completed.

19. The non-transitory computer-readable storage medium according to claim 17, wherein the block attribute information of the second block comprises the block height of the second block, and determining whether the target consensus validation message meets a cache condition comprises:
determining a height difference between the block height of the second block and the block height of the first block; and
in accordance with a determination that the height difference is less than or equal to a height difference threshold, determining that the target consensus validation message meets the cache condition.

20. The non-transitory computer-readable storage medium according to claim 17, wherein the block attribute information of the second block comprises the block height of the second block and a consensus view identifier (ID) corresponding to the second block, and determining whether the target consensus validation message meets a cache condition comprises:
in accordance with a determination that the block height of the second block matches the block height of the first block and the target consensus validation message is a target proposal message, acquiring a consensus view difference between the consensus view ID corresponding to the second block and a consensus view ID corresponding to the first block, wherein the target proposal message is a proposal message for proposing the second block generated in the block proposal phase in which consensus validation is performed on the second block; and
in accordance with a determination that the consensus view difference is less than or equal to a consensus view difference threshold, determining that the target proposal message meets the cache condition.

* * * * *